(12) United States Patent
Aoki et al.

(10) Patent No.: US 8,853,120 B2
(45) Date of Patent: Oct. 7, 2014

(54) DOUBLE LAYERED EXHAUST GAS PURIFICATION CATALYST

(75) Inventors: Yuki Aoki, Nissin (JP); Takeshi Nobukawa, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 13/981,942

(22) PCT Filed: Jan. 26, 2012

(86) PCT No.: PCT/IB2012/000106
§ 371 (c)(1),
(2), (4) Date: Jul. 26, 2013

(87) PCT Pub. No.: WO2012/101505
PCT Pub. Date: Aug. 2, 2012

(65) Prior Publication Data
US 2013/0310248 A1    Nov. 21, 2013

(30) Foreign Application Priority Data
Jan. 27, 2011 (JP) .................................. 2011-014926

(51) Int. Cl.
*B01J 23/00* (2006.01)
*B01J 23/02* (2006.01)
(Continued)

(52) U.S. Cl.
CPC ......... *B01J 23/63* (2013.01); *B01J 2255/1023* (2013.01); *B01J 37/0244* (2013.01); *B01J 35/0006* (2013.01); *B01D 2255/1021* (2013.01); *B01J 37/0248* (2013.01); *Y02T 10/22* (2013.01); *B01D 2255/9032* (2013.01); *B01D 2255/9022* (2013.01); *B01D 53/945* (2013.01); *B01D 2255/1025* (2013.01); *B01D 2255/908* (2013.01); *B01D 2255/407* (2013.01); *Y10S 502/52712* (2013.01); *Y10S 502/52713* (2013.01)

USPC ........... 502/303; 502/302; 502/304; 502/327; 502/332; 502/333; 502/334; 502/339; 502/349; 502/355; 502/415; 502/439; 502/527.12; 502/527.13

(58) Field of Classification Search
USPC ......... 502/302–304, 327, 332–334, 339, 349, 502/355, 415, 439, 527.12, 527.13
See application file for complete search history.

(56) References Cited

U.S. PATENT DOCUMENTS 7,247,597 B2 * 7/2007 Morikawa et al. ............ 502/304
8,057,924 B2 * 11/2011 Kaiser et al. .................. 428/701
(Continued)

FOREIGN PATENT DOCUMENTS

CN    101568381    10/2009
EP    2 127 744 A1    12/2009
(Continued)

OTHER PUBLICATIONS

Applicant's Response to the Written Opinion of the International Searching Authority in International Application No. PCT/IB2012/000106 (Jul. 19, 2012).

*Primary Examiner* — Cam N. Nguyen
(74) *Attorney, Agent, or Firm* — Finnegan, Henderson, Farabow, Garrett & Dunner, LLP

(57) ABSTRACT

An exhaust gas purification catalyst has a substrate, a lower catalyst layer that is formed on the substrate and contains at least one of Pd and Pt, and an upper catalyst layer that is formed on the lower catalyst layer and contains Rh. A region that does not contain the upper catalyst layer is disposed on the exhaust gas upstream side of this exhaust gas purification catalyst. The lower catalyst layer includes a front-stage lower catalyst layer on the exhaust gas upstream side and a rear-stage lower catalyst layer on the exhaust gas downstream side. The front-stage lower catalyst layer contains an oxygen storage material.

9 Claims, 5 Drawing Sheets

(51) Int. Cl.

| | | |
|---|---|---|
| *B01J 23/08* | (2006.01) |
| *B01J 23/10* | (2006.01) |
| *B01J 23/40* | (2006.01) |
| *B01J 23/42* | (2006.01) |
| *B01J 23/44* | (2006.01) |
| *B01J 23/56* | (2006.01) |
| *B01J 21/04* | (2006.01) |
| *B01J 20/00* | (2006.01) |
| *B01J 37/02* | (2006.01) |
| *B01J 35/00* | (2006.01) |
| *B01J 23/63* | (2006.01) |
| *B01D 53/94* | (2006.01) |

(56) References Cited

U.S. PATENT DOCUMENTS

| | | | |
|---|---|---|---|
| 8,202,819 B2* | 6/2012 | Kohara et al. | 502/304 |
| 8,337,791 B2* | 12/2012 | Kohara et al. | 423/213.2 |
| 2004/0001781 A1 | 1/2004 | Kumar et al. | |
| 2006/0270550 A1 | 11/2006 | Shimizu et al. | |
| 2008/0042104 A1 | 2/2008 | Chen et al. | |
| 2008/0096759 A1 | 4/2008 | Hori et al. | |
| 2009/0257933 A1 | 10/2009 | Chen et al. | |
| 2010/0061903 A1 | 3/2010 | Kohara et al. | |
| 2010/0150792 A1 | 6/2010 | Kitamura et al. | |
| 2011/0113754 A1 | 5/2011 | Kohara et al. | |
| 2012/0021899 A1 | 1/2012 | Nobukawa et al. | |

FOREIGN PATENT DOCUMENTS

| | | |
|---|---|---|
| EP | 2 130 582 A1 | 12/2009 |
| JP | 2003-246624 | 9/2003 |
| JP | 2005-170774 | 6/2005 |
| JP | 2006-326428 | 12/2006 |
| JP | 2007-38072 | 2/2007 |
| JP | 2010-5590 | 1/2010 |
| JP | 2010-5592 | 1/2010 |
| JP | 2012-24701 | 2/2012 |
| JP | 2012-40547 | 3/2012 |
| WO | WO 2006/046316 A1 | 5/2006 |
| WO | WO 2008/093471 A1 | 8/2008 |
| WO | WO 2010/001226 A1 | 1/2010 |
| WO | WO 2010/064497 A1 | 6/2010 |
| WO | WO 2011/081219 A2 | 7/2011 |

* cited by examiner

DOUBLE LAYERED EXHAUST GAS PURIFICATION CATALYST

CROSS-REFERENCE TO RELATED APPLICATIONS

This application is a national phase application of International Application No. PCT/IB2012/000106, filed Jan.26, 2012, and claims the priority of Japanese Application No. 2011-014926, filed Jan. 27, 2011, the content of both of which is incorporated herein by reference.

BACKGROUND OF THE INVENTION

1. Field of the Invention

The invention relates to an exhaust gas purification catalyst and more particularly to an exhaust gas purification catalyst in which a plurality of different catalyst layers are coated on a substrate.

2. Description of Related Art

Three-way Catalysts, which simultaneously carry out oxidation of the carbon monoxide (CO) and hydrocarbon (HC) and reduction of the nitrogen oxide (NOx) in the exhaust gas, are used as exhaust gas purification catalysts in automotive applications. In a widely available three-way catalyst, a catalyst layer made of a porous oxide, e.g., alumina ($Al_2O_3$), is coated on a cordierite honeycomb substrate and noble metal, e.g., platinum (Pt), rhodium (Rh), palladium (Pd), and so forth, is supported on this catalyst layer.

In addition, controlling the ratio between the air and fuel (air-fuel ratio A/F) supplied to the engine of an automobile to around the stoichiometric air-fuel ratio (stoichiometric) is critical for achieving the simultaneous and efficient purification of the three components CO, HC, and NOx by the action of the three-way catalyst. However, the actual air-fuel ratio varies to the rich side (fuel-rich atmosphere) or the lean side (fuel-lean atmosphere) around the stoichiometric due to, for example, the vehicle driving conditions, and as a consequence the exhaust gas atmosphere similarly also varies to the rich side or lean side. Accordingly, a high purification performance cannot always be maintained with just a three-way catalyst alone. Thus, in order to increase the exhaust gas purification capacity of a three-way catalyst by absorbing variations in the oxygen concentration in the exhaust gas, an oxygen storage material having a so-called oxygen storage capacity (OSC)—wherein oxygen is intaken when the oxygen concentration in the exhaust gas is high and oxygen is released when the oxygen concentration in the exhaust gas is low—is used in the exhaust gas purification catalyst; a ceria-zirconia ($CeO_2$—$ZrO_2$) composite oxide is an example of such an oxygen storage material, However, exhaust gas regulations for, e.g., automobiles and so forth, have been becoming more and more rigorous throughout the world over the last few years, and responding to this has required additional improvements in the catalytic performance of exhaust gas purification catalysts. Thus, in order to bring about the effective manifestation of the functionalities of the aforementioned noble metals, oxygen storage material, and so forth, that are used in exhaust gas purification catalysts, exhaust gas purification catalysts have been proposed in which these materials are disposed on a substrate in a plurality of catalyst layers that are each different (refer, for example, to Japanese Patent Application Publication Nos. 2007-038072 (JP-A-2007-038072), 2006-326428 (JP-A-2006-326428), and 2010-005592 (JP-A-2010-005592)).

Various investigations have also been carded out into the material of the oxygen storage material itself. For example, because a $CeO_2$—$ZrO_2$ composite oxide having a pyrochlore phase has a high OSC, several proposals have also been made with regard to exhaust gas purification catalysts that use such a material (refer, for example, to Japanese Patent Application Publication Nos. 2003-246624 (JP-A-2003-246624) and 2005-170774 (JP-A-2005-170774) and WO 2008/093471).

It is very important for improving the exhaust gas purification performance of three-way catalysts that the catalyst metal that is the active metal species of the three-way catalyst, e.g., Pd, Pt, Rh, and so forth, be supported in a highly disperse state on the catalyst support. In the particular case of application as an automotive exhaust gas purification catalyst, the temperature to which the catalyst is exposed undergoes repeated variation between ambient temperature and approximately 1000° C., and the atmosphere to which the catalyst is exposed also repeatedly varies between a reducing atmosphere having a high concentration of HC and CO and a low $O_2$ concentration and an oxidizing atmosphere having a low concentration of HC and CO and a high $O_2$ concentration, Accordingly, it is also necessary to maintain the catalyst metal, e.g., Pd, Pt, Rh, and so forth, supported in a highly disperse state on the catalyst support under these conditions as well.

However, when these catalyst metals are subjected to long-term exposure to high temperatures, they migrate on the support and form coarse particles, that is, sintering occurs. A catalyst metal that has undergone particle growth due to sintering cannot maintain a high contact surface area with the exhaust gas, and the exhaust gas purification performance of the catalyst then ultimately declines with elapsed time. In addition to sintering-induced particle growth under high temperatures, the Pt and Rh are converted to the oxide and undergo particle growth in strongly oxidizing atmospheres, such as during fuel cut-off operation, while Pd also undergoes particle growth in a strongly reducing atmosphere, such as during acceleration, with the result that the exhaust gas purification performance of the catalyst ends up declining.

JP-A-2007-038072, JP-A-2006-326428, and JP-A-2010-005592 describe exhaust gas purification catalysts in which a plurality of different catalyst layers are coated on a substrate and also state that an excellent exhaust gas purification performance can be achieved with these exhaust gas purification catalysts even during, for example, cold starting and warm up. However, the inhibition of catalyst metal particle growth is not necessarily thoroughly examined in JP-A-2007-038072, JP-A-2006-326428, and JP-A-2010-005592, and there is thus still room to improve the exhaust gas purification catalysts described in this related art in terms of raising the exhaust gas purification performance.

SUMMARY OF THE INVENTION

The invention therefore provides an exhaust gas purification catalyst wherein particle growth by the catalyst metal can be inhibited due to a novel structure.

A first aspect of the invention relates to an exhaust gas purification catalyst that has a substrate, a lower catalyst layer that is formed on the substrate and contains at least one of Pd and Pt, and an upper catalyst layer that is formed on the lower catalyst layer and contains Rh. in this exhaust gas purification catalyst, a region that does not contain the upper catalyst layer is disposed on an exhaust gas upstream side of the exhaust gas purification catalyst, the lower catalyst layer is formed of a front-stage lower catalyst layer on the exhaust gas upstream side and a rear-stage lower catalyst layer on an exhaust gas downstream side, and the front-stage lower catalyst layer contains an oxygen storage material. The oxygen storage material in the exhaust gas purification catalyst according to this aspect may contain a $CeO_2$ or a $CeO_2$—$ZrO_2$ composite oxide. This $CeO_2$—$ZrO_2$ composite oxide may have a pyrochlore phase formed of $Ce_2Zr_2O_7$.

An amount of addition of the $CeO_2$—$ZrO_2$ composite oxide may be at least 5 g. Moreover, a catalyst support that supports at least one of Pd and Pt in the front-stage lower catalyst layer may be a $ZrO_2$ composite oxide having $ZrO_2$ as its main component and further containing at least one element selected from the group consisting of La, Y, Pr, and Nd. The front-stage lower catalyst layer may be coated over 20 to 35% of the total length of the substrate, the rear-stage lower catalyst layer may be coated over 65 to 80% of the total length of the substrate, and the upper catalyst layer may be coated over 80 to 90% of the total length of the substrate.

Through the placement of an oxygen storage material in the front-stage lower catalyst layer on the exhaust gas upstream side of the substrate, the exhaust gas purification catalyst of the invention can inhibit particle growth by each of the catalyst metals supported in each of the catalyst layers and particularly in the rear-stage lower catalyst layer and upper catalyst layer that are on the exhaust gas downstream side. Through the disposition on the exhaust gas upstream side of a region that does not contain the upper catalyst layer, the exhaust gas purification catalyst of the invention can raise the diffusibility of HC into the interior of the front-stage lower catalyst layer and as a result can promote HC purification at the front-stage lower catalyst layer and in consequence thereof can achieve a satisfactory catalyst warm-up performance. This exhaust gas purification catalyst is therefore able to achieve a high exhaust gas purification performance for the catalyst as a whole.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
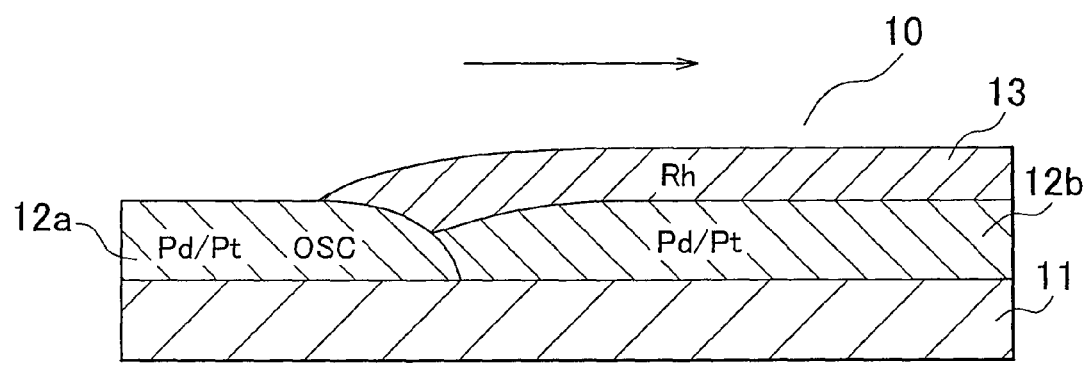
FIG. 1 is a schematic diagram that shows a cross section of the catalyst layers in the exhaust gas purification catalyst of the invention.

FIG. 1 is a schematic diagram that shows a cross section of the catalyst layers in an exhaust gas purification catalyst according to an embodiment of the invention. The exhaust gas purification catalyst 10 of this embodiment contains, as catalyst layers, a lower catalyst layer 12 and an upper catalyst layer 13 on a substrate 11, and has a region lacking the upper catalyst layer 13 disposed on the upstream portion of the catalyst considered with respect to the direction of exhaust gas flow. In addition, the lower catalyst layer 12 is formed of a front-stage lower catalyst layer 12a on the exhaust gas upstream side and a rear-stage lower catalyst layer 12b on the exhaust gas downstream side, The front-stage lower catalyst layer 12a and the rear-stage lower catalyst layer 12b each contain at least one of Pd and Pt, and the front-stage lower catalyst layer 12a further contains an oxygen storage material (a material with an OSC). The upper catalyst layer 13 contains Rh as a catalyst metal.

As noted above, particle growth can occur with each of the noble metals used as catalyst metals in the exhaust gas purification catalyst, i.e., Pd, Pt, Rh, and so forth, under the influence of the temperature and atmosphere to which the catalyst is exposed. In addition, catalyst metal that has undergone particle growth cannot maintain a high area of contact with the exhaust gas, which results in a decline in the exhaust gas purification performance of the catalyst. On the other hand, and also as previously noted, the exhaust gas atmosphere to which the catalyst is exposed varies depending on the vehicle driving conditions to the rich (fuel-rich atmosphere) side or lean (fuel-lean atmosphere) side. The following tests were carried out in order to examine the influence exercised by the exhaust gas atmosphere—and particularly its variation—on particle growth by the catalyst metal.

The catalyst used in the tests was prepared by supporting Rh on an alumina powder by an impregnation method and molding the resulting powder into pellet form. Durability testing was carried out by switching a plurality of times at a prescribed time interval and a prescribed temperature between a rich model gas ($CO/N_2$ balance or propylene ($C_3H_6)N_2$ balance) and a lean model gas ($O_2/N_2$ balance). After this durability testing, the average particle diameter of the Rh particles was calculated for each catalyst using a crystallite diameter calculation method based on measurement of the half-value width in X-ray diffraction. These results are shown in FIGS. 2 and 3.

Figure 2:
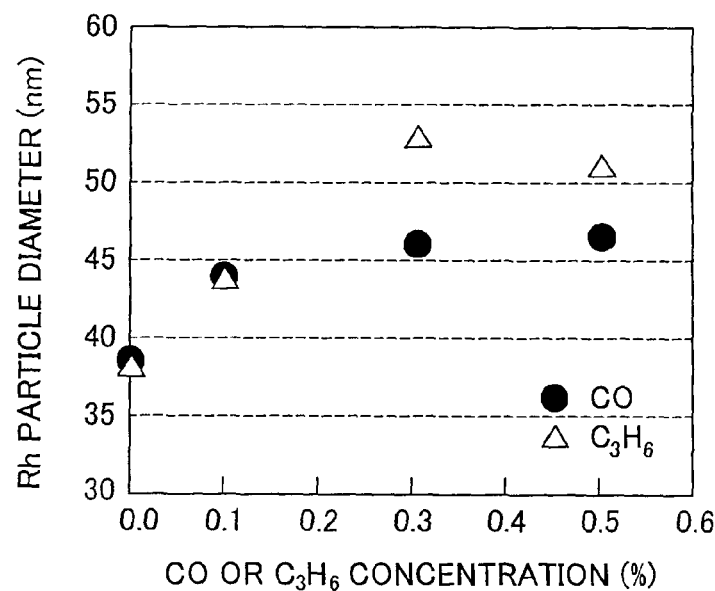
FIG. 2 is a graph that shows the relationship between the atmosphere to which the catalyst is exposed and the particle diameter of the catalyst metal.
Figure 3:
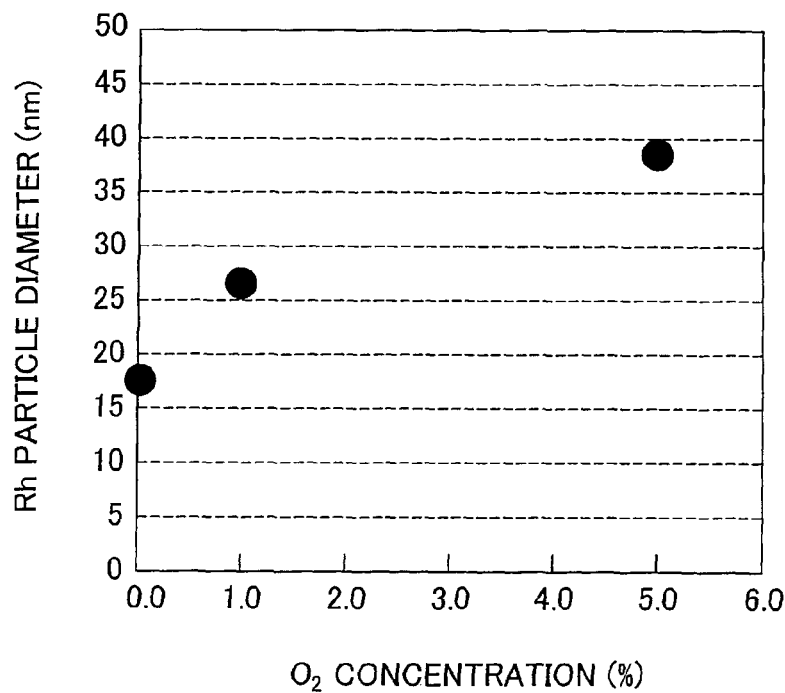
FIG. 3 is a graph that shows the relationship between the atmosphere to which the catalyst is exposed and the particle diameter of the catalyst metal.

FIG. 2 shows the results when the $O_2$ concentration in the lean model gas was fixed at a prescribed concentration and the CO or $C_3H_6$ concentration in the rich model gas was varied. Similarly, FIG. 3 shows the results when the CO concentration in the rich model gas was fixed at a prescribed concentration and the $O_2$ concentration in the lean model gas was varied.

An examination of FIG. 2 demonstrates that, for both of the gases CO and $C_3H_6$, particle growth by the Rh particles progresses more at a higher concentration of these gases, i.e., in a more reducing atmosphere, and at a larger fluctuation in this reducing atmosphere. Similarly, an examination of FIG. 3 demonstrates that particle growth by the Rh particles progresses more at a higher $O_2$ concentration, i.e., in a more oiidizing atmosphere, and at a larger fluctuation in this oxidizing atmosphere. These results also show that the development of particle growth by the noble metal used as the catalyst metal in the exhaust gas purification catalyst, e.g., Rh and so forth, is accelerated, regardless of whether the atmosphere to which the catalyst is exposed is reducing or oxidizing, as the strength of these atmospheres increases and as the size of the fluctuation in these atmospheres increases. Accordingly, it can be Concluded that inhibiting the variation in the exhaust gas atmosphere flowing into the catalyst is extremely important for inhibiting particle growth by the catalyst metal and thereby maintaining a high catalyst activity.

With regard to an exhaust gas purification catalyst as shown in FIG. 1, i.e., a so-called zone-coated catalyst in which a plurality of different catalyst layers are coated on the exhaust gas upstream side and exhaust gas downstream side of a substrate, the inventors discovered that particle growth by each of the catalyst metals supported on the individual catalyst layers, and particularly in the upper catalyst layer 13 and the rear-stage lower catalyst layer 12b on the exhaust gas downstream side, can be substantially inhibited by placing a material that has an OSC, i,e., an oxygen storage material, in the front-stage lower catalyst layer 12a.

Without intending to be bound by any particular theory, it is thought that in the exhaust gas purification catalyst of this embodiment the HC and CO in the exhaust gas are mainly oxidatively purified in the front-stage lower catalyst layer 12a that resides on the exhaust upstream side; the residual HC and so forth that did not undergo oxidative purification in the front-stage lower catalyst layer are removed in the rear-stage lower catalyst layer 12b that resides on the exhaust gas downstream side; and the NOx is mainly reductively purified in the upper catalyst layer 13 that resides on the exhaust gas downstream side. Accordingly, it is thought that the exhaust purification performance of the exhaust gas purification catalyst, and particularly its NOx purification performance, are substantially improved due to an inhibition in particular of particle growth by the catalyst metal supported in the catalyst layers on the exhaust gas downstream side, which is brought about by the placement of an oxygen storage material in the front-stage lower catalyst layer 12a.

There are no particular limitations on the substrate 11 in this embodiment, and any material ordinarily used in an exhaust gas purification catalyst can be used for the substrate 11. In specific terms, a honeycomb-configured material having a large number of cells can be used for the substrate 11; for example, a heat-resistant ceramic material, e.g., cordierite ($2MgO \cdot 2Al_2O_3 \cdot 5SiO_2$), alumina, zirconia, silicon carbide, and so forth, or a metal material formed of a metal foil of, e.g., stainless steel, can be used for the substrate 11.

There are no particular limitations in this embodiment on the catalyst support constituting the lower catalyst layer 12, i.e., the front-stage lower catalyst layer 12a and the rear-stage lower catalyst layer 12b, that is coated on the substrate 11, and any metal oxide generally used as a catalyst support can be used. This catalyst support can be exemplified by a metal oxide selected from the group consisting of alumina ($Al_2O_3$), zirconia ($ZrO_2$), ceria ($CeO_2$), silica ($SiO_2$), titania ($TiO_2$), and their combinations, and the use for the front-stage lower catalyst layer 12a of a metal oxide having $ZrO_2$ as its main component is particularly preferred.

Particularly at low temperatures, e.g., during a cold engine start, the exhaust gas purification catalyst of this embodiment carries out purification of the HC in the exhaust gas mainly by the Pd and/or Pt supported in the front-stage lower catalyst layer 12a. The reaction heat produced during this HC purification then warms the rear-stage lower catalyst layer 12b and the upper catalyst layer 13 that reside on the exhaust gas downstream side, and this functions to activate the catalyst metals supported in these catalyst layers. Thus, in order to accelerate this catalyst warming and improve the purification performance of the catalyst as a whole, the use is preferred for the catalyst support constituting the front-stage lower catalyst layer 12a of a catalyst support that has a low specific heat and is thus easily warmed. Given this, the use is more preferred for this catalyst support of a metal oxide having $ZrO_2$—which has a lower specific heat than the metal oxides generally used for catalyst supports, e.g., $Al_2O_3$ and so forth—as its main component. This concept of "having $ZrO_2$ as its main component" as used in the invention means that $ZrO_2$ accounts for more than 50% of the total mass of the materials that constitute the catalyst support.

When a metal oxide having $ZrO_2$ as its main component is used for the catalyst support constituting the lower catalyst layer 12 in this embodiment and particularly for the catalyst support constituting the front-stage lower catalyst layer 12a, in addition to the $ZrO_2$ this metal oxide may also contain a supplementary element such, as an alkaline-earth metal, a rare-earth element, and so forth, and preferably contains at least one supplementary element selected from the group consisting of lanthanum (La), yttrium (Y), praseodymium (Pr), and neodymium (Nd), and more preferably contains La and/or Y. The addition of such a supplementary element can improve the heat resistance of $ZrO_2$.

In this embodiment, at least one of Pd and Pt is supported as a catalyst metal in the lower catalyst layer 12 containing the previously described catalyst support, i.e., in the front-stage lower catalyst layer 12a and the rear-stage lower catalyst layer 12b. The catalyst metal supported in the lower catalyst layer 12 is not necessarily limited to only Pd and/or Pt, and a metal or metals other than these metals may optionally be supported as appropriate in addition to these metals or in place of a portion of these metals, for example, Rh and so forth may be supported.

Generally, when Rh is used in the same catalyst layer as Pd and/or Pt, the NOx purification performance of the Rh may be reduced by a reaction occurring at high temperatures between the Rh and Pd and/or Pt that results in a partial alloying. However, when considered from the perspective of the oxidation activity for HC and CO, this alloying may not necessarily have a deleterious effect and may on the contrary have an advantageous action, As previously noted, the Pd and/or Pt supported in the lower catalyst layer 12 in the exhaust gas purification catalyst of this embodiment has mainly an oxidative purification action on the He and CO in the exhaust gas. Thus, when a metal other than Pd or Pt is supported in the lower catalyst layer 12, this other metal should be selected as appropriate—with a thorough consideration of the oxidation activity for HC and CO by the Pd and/or Pt—within a range in which these oxidation activities are not impaired.

The front-stage lower catalyst layer 12a contains an oxygen storage material in this embodiment. This oxygen storage material is not particularly limited so long as it has an OSC, however, the use of ceria ($CeO_2$) or a ceria-zirconia ($CeO—ZrO_2$) composite oxide is preferred.

In this embodiment, the oxygen storage material, and particularly $CeO_2$ or a, $CeO_2—ZrO_2$ composite oxide, may additionally contain a supplementary component. For example, the $CeO_2$ or $CeO_2—ZrO_2$ composite oxide may further contain at least one element selected from the group consisting of alkaline-earth metals and rare-earth elements. The addition of such a supplementary element can improve the heat resistance of the $CeO_2$ or $CeO_2—ZrO_2$ composite oxide. This supplementary element can be specifically exemplified by lanthanum (La), yttrium (Y), praseodymium (Pr), neodymium (Nd), and combinations of the preceding, wherein La and/or Y is particularly preferred.

Fluctuations in the atmosphere in the exhaust gas flowing into the exhaust gas purification catalyst can be reliably inhibited by the disposition of the aforementioned oxygen storage material in the front-stage lower catalyst layer 12a, and in consequence thereof particle growth by the catalyst metal supported in the individual catalyst layers—and particularly in the upper catalyst layer 13 and rear-stage lower catalyst layer 12b residing on the exhaust gas downstream side—can be inhibited.

Particle growth by the catalyst metal supported in the individual catalyst layers on the exhaust gas downstream side can also be inhibited, for example, when the oxygen storage material is disposed in the rear-stage lower catalyst layer 12b but not in the front-stage lower catalyst layer 12a. However, the inhibitory effect on catalyst metal particle growth obtained in this case is not always satisfactory when compared to disposition of the oxygen storage material in the front-stage lower catalyst layer 12a.

The oxygen storage material may be disposed not just in the front-stage lower catalyst layer 12a, but also additionally in the rear-stage lower catalyst layer 12b. NOx is mainly reductively purified by the Rh supported in the upper catalyst layer 13 residing on the exhaust gas downstream side in the exhaust gas purification catalyst of this embodiment. Here, the disposition of the oxygen storage material in the rear-stage lower catalyst layer 12b residing on the exhaust gas downstream side makes it possible to regulate the air-fuel ratio A/F in the exhaust gas to a desirable A/F value for the reductive purification of NOx by Rh. That is, the exhaust gas purification performance for the exhaust gas purification catalyst as a whole, and in particular the NOx purification performance, can be further improved by also disposing an oxygen storage material in the rear-stage lower catalyst layer 12b in addition to its disposition in the front-stage lower catalyst layer 12a. When the oxygen storage material is also disposed in the rear-stage 15. lower catalyst. layer 12b, this oxygen storage material may be used as a catalyst support in the rear-stage lower catalyst layer 12b and the Pd and/or Pt may be supported thereon.

The inventors also discovered that the inhibitory effect on catalyst metal particle growth is further improved by the use as the oxygen. storage material of a $CeO_2$—$ZrO_2$ composite oxide having a pyrochlore phase formed of $Ce_2Zr_2O_7$.

This $CeO_2$—$ZrO_2$ composite oxide having a pyrochlore phase has a higher OSC than a conventional $CeO_2$—$ZrO_2$ composite oxide having, for example, a tetragonal or cubic crystalline structure. The use of a $CeO_2$—$ZrO_2$ composite oxide having a pyrochlore phase in exhaust gas purification catalysts has therefore been investigated and has been proposed in the related art. However, the related art contains no specific showing whatsoever with regard to the relationship between such a $CeO_2$—$ZrO_2$ composite oxide having a pyrochlore phase and particle growth by the catalyst metal. Therefore, the idea that catalyst metal particle growth can be inhibited by the appropriate disposition of a $CeO_2$—$ZrO_2$ composite oxide having a pyrochlore phase in the catalyst layer of an exhaust gas purification catalyst, as in the invention, and the idea that a $CeO_2$—$ZrO_2$ composite oxide having a pyrochlore phase has a better inhibitory effect on this catalyst metal particle growth than a conventional $CeO_2$—$ZrO_2$ composite oxide having, for example, a tetragonal or cubic crystalline structure, again as in the invention, are quite unanticipated and should be regarded as surprising.

The exhaust gas purification catalyst in this embodiment, for example, may use the oxygen storage material as a support in the front-stage lower catalyst layer 12a, and the Pd and/or Pt may be supported on this oxygen storage material. Thus, in this embodiment the oxygen storage material may be used in combination with a catalyst support, e.g., the previously described metal oxide having $ZrO_2$ as its main component, or may be used in its place, However, the previously described $CeO_2$—$ZrO_2$ composite oxide having a pyrochlore phase typically has a small specific surface area and thus may not always be suitable as a catalyst support. As a consequence, in the particular case of the use in this embodiment of a $CeO_2$—$ZrO_2$ composite oxide having a pyrochlore phase as the oxygen storage material, for example, the previously described metal oxide having $ZrO_2$ as its main component is preferably used as the catalyst support in the front-stage lower catalyst layer 12a.

The oxygen storage material can be added in this embodiment to the front-stage lower catalyst layer 12a in an amount sufficient to inhibit particle growth by the individual catalyst metals supported in the individual catalyst layers and particularly in the rear-stage lower catalyst layer 12b and the upper catalyst layer 13. For example, the oxygen storage material is generally coated on the substrate in an amount that provides 20 to 100 g/substrate-L (per 1 L of substrate) and preferably 30 to 60 g/substrate-L as the amount of oxygen storage material with reference to the substrate, although there is no particular limitation to this.

When a $CeO_2$—$ZrO_2$ composite oxide having a pyrochlore phase is used as the aforementioned oxygen storage material, preferably at least 5 g and more preferably from 5 to 20 g of the $CeO_2$—$ZrO_2$ composite Oxide having a pyrochlore phase can be added to the front-stage lower catalyst layer 12a.

When the amount of addition for the $CeO_2$—$ZrO_2$ composite oxide having a pyrochlore phase is less than 5 g, the inhibitory effect on particle growth by the individual catalyst metals, i.e., Pd and/or Pt and Rh, supported in the individual catalyst layers and particularly in the rear-stage lower catalyst layer 12b and the upper catalyst layer 13 may be almost nonexistent or may be unsatisfactory. When, on the other hand, the amount of addition for the $CeO_2$—$ZrO_2$ composite oxide having a pyrochlore phase is too large, the engine controllability may deteriorate, although the catalyst will have a high oxygen storage capacity.

Considering this in greater detail, for example, an oxygen ($O_2$) sensor is generally installed in the exhaust pipe downstream from the exhaust gas purification catalyst and the condition of the catalyst is monitored based on the output signal from this $O_2$ sensor. The output signal from this $O_2$ sensor is also used in, for example, feedback control of the air-fuel ratio. However, when too much oxygen storage material is present in the exhaust gas purification catalyst, this oxygen storage material continuously absorbs the oxygen in the exhaust gas flowing into the catalyst. When this occurs, even when the catalyst itself is exposed to an oxygen-containing atmosphere, a state persists in which the gas at the catalyst exit lacks oxygen. In such a case, the $O_2$ sensor installed in the exhaust pipe on the downstream side from the catalyst cannot always accurately indicate the state of the catalyst, and as a result, for example, suitable control of the air-fuel ratio cannot be performed. This deterioration in the controllability becomes particularly significant when the amount of addition of the $CeO_2$—$ZrO_2$ composite oxide having a pyrochlore phase exceeds 20 g.

Any $CeO_2$—$ZrO_2$ composite oxide commercially available as an oxygen storage material can be used as the $CeO_2$—$ZrO_2$ composite oxide in this embodiment. Alternatively, this $CeO_2$—$ZrO_2$ composite oxide can be produced by any method available to the individual skilled in the art. For example, co-precipitation can be brought about by the addition of a base, e.g., aqueous ammonia, to a mixed solution prepared by the dissolution of the salts of the metals that make up the $CeO_2$—$ZrO_2$ composite oxide, for example, Ce and Zr and, depending on the case; a metal such as La, Y, and so forth, and subjecting this to a heat treatment, e.g., an oxidation treatment and reduction treatment and so forth, to produce a CeO$_2$—ZrO$_2$ composite oxide in which the oxides of the individual metals are in solid solution, A CeO$_2$—ZrO$_2$ composite oxide having a pyrochlore phase can he prepared by performing the aforementioned reduction treatment, for example, for a prescribed time at a temperature of about 1700° C.

There are no particular limitations in this embodiment on the catalyst support constituting the upper catalyst layer 13 that is coated on the lower catalyst layer 12, and any metal oxide generally used as a catalyst support can be used. This catalyst support can be exemplified by a metal oxide selected from the group consisting of alumina (Al$_2$O$_3$), zirconia (ZrO$_2$), ceria (CeO$_2$), silica (SiO$_2$), titania (TiO$_2$), and their combinations.

Rh is supported in this embodiment as a catalyst metal in the upper catalyst layer 13 containing the aforementioned catalyst support. The catalyst metal supported in the upper catalyst layer 13 is not necessarily limited to only Rh, and another metal or metals may optionally be supported as appropriate in addition to the Rh or in place of a portion of the Rh, for example, Pd, Pt, and so forth, may be supported. The Rh in the exhaust gas purification catalyst of thisembodiment functions mainly to reductively purify the NOx in the exhaust gas. However, when large amounts of metal other than Rh, for example, Pd and/or Pt, are added to the upper catalyst layer 13, these metals can react with the Rh at high temperatures, resulting in a partial alloying and causing a decline in the NOx purification performance of the Rh. Accordingly, when a metal other than Rh is supported in the upper catalyst layer 13, this other metal is preferably added within a range in which the NOx reduction activity of the Rh is not impaired.

A region that does not contain the upper catalyst layer 13 is disposed on the exhaust gas upstream side in the exhaust gas purification catalyst of this embodiment, As noted previously for the exhaust gas purification catalyst of this embodiment, and in particular at low temperatures as In an engine cold start, the HC in the exhaust gas is purified mainly by the Pd and/or Pt supported in the front-stage lower catalyst layer 12a, and the upper catalyst layer 13 and the rear-stage lower catalyst layer 12b on the exhaust gas downstream side are warmed by the reaction heat generated during this NC purification. Increasing the diffusibility of the HC into the interior of the front-stage lower catalyst layer 12a is critical for promoting this catalyst warming and improving the purification performance of the catalyst as a whole.

The HC diffusibility into the interior of the front-stage lower catalyst layer 12a can be increased over that of, for example, a structure in which the front-stage lower catalyst layer 12a is completely covered by the upper catalyst layer 13, by disposing, in accordance with the exhaust gas purification catalyst of this embodiment, a region that does riot contain the upper catalyst 13 on the exhaust gas upstream side, Le., by exposing at least a portion of the front-stage lower catalyst layer 12a to the inflowing exhaust gas. For example, the front-stage lower catalyst layer 12a may be exposed to the inflowing exhaust gas over from 10 to 20% of the total length of the substrate 11. As a result of this, HC purification at the front-stage lower catalyst layer 12a is promoted and a satisfactory catalyst warm-up performance can then be achieved.

In the exhaust gas purification catalyst of this embodiment, the front-stage lower catalyst layer 12a is coated on the exhaust gas upstream portion of the substrate 11 over from 20 to 35% of the total length of the substrate 11 and the rear-stage lower catalyst layer 12b is coated on the exhaust gas downstream side from the front-stage lower catalyst layer 12a over from 65 to 80% of the total length of the substrate 11. The upper catalyst layer 13 is coated on the lower catalyst layer 12 over from 80 to 90% of the total length of the substrate 11, but excluding its exhaust gas upstream portion. In particular, particle growth for each of the catalyst metals supported in the upper catalyst layer 13 and the rear-stage lower catalyst layer 12b on the exhaust gas downstream side can be substantially inhibited by coating the front-stage lower catalyst layer 12a containing an oxygen storage material on the exhaust gas upstream portion of the substrate 11 over from 20 to 35% of the total length of the substrate 11. Moreover, the coating of the front-stage lower catalyst layer 12a in this range brings about a satisfactory manifestation in particular of the HC purification activity of the front-stage lower catalyst layer 12a, even at low temperatures, and as a result can achieve a satisfactory catalyst warming performance.

On the other hand, while the NOx in the exhaust gas is mainly reductively purified in the upper catalyst layer 13 on the exhaust gas downstream side, the reaction rate of this NOx reduction reaction is generally slower than the oxidation reaction of, for example, the HC. Furthermore, the Rh supported in a portion of the upper catalyst layer 13 on the exhaust gas upstream side thereof may, for example, be poisoned by attachment of the HC in the exhaust gas and the NOx reduction activity may not be adequately manifested as a result. Accordingly, the catalytic performance of the obtained exhaust gas purification catalyst, and particularly its NOx reduction activity, can be further improved by coating the upper catalyst layer 13 over 80 to 90% of the total length of the substrate 11 in a configuration in which a portion of the front-stage lower catalyst layer 12a is covered over, as shown in FIG. 1, but within a range in which the catalytic activity of the front-stage lower catalyst layer 12a is not impaired. However, the catalyst layer structure shown in FIG. 1 does nothing more than simply show a preferred aspect of the exhaust gas purification catalyst of this embodiment, and there is thus no intent to limit the exhaust gas purification catalyst of this embodiment to this aspect. Thus, for example, the upper catalyst layer 13 in the exhaust gas purification catalyst of this embodiment may be coated on the lower catalyst layer 12 over the same range as the rear-stage lower catalyst layer 12b or may be coated on the lower catalyst layer 12 over a range shorter than this.

The exhaust gas purification catalyst of this embodiment, in which a lower catalyst layer 12, and particularly a front-stage lower catalyst layer 12a and a rear-stage lower catalyst layer 12b, and an upper catalyst layer 13 are coated on a substrate, can be produced by any method available to the individual skilled in the art, For example, the front-step lower catalyst layer 12a may be first formed on the substrate 11 by coating, for example, by a commonly used washcoat method, a layer containing the catalyst support, Pd and/or Pt, and an oxygen storage material over a prescribed range on the exhaust gas upstream portion of a honeycomb substrate 11, e.g., of cordierite, followed by drying, firing, and so forth for prescribed times at prescribed temperatures. Proceeding similarly, the rear-stage lower catalyst layer 12b containing a catalyst support and Pd and/or Pt is then formed on the substrate 11 on the exhaust gas downstream side from the front-stage lower catalyst layer 12a.

Finally, the upper catalyst layer 13 may be formed by coating, again over a prescribed range by, for example, a washcoat method, a layer containing Rh and a catalyst support on the obtained lower catalyst layer 12 formed of the front-stage lower catalyst layer 12a and the rear-stage lower catalyst layer 12b and thereafter carrying out drying, firing, and so forth for prescribed times at prescribed temperatures. When the individual catalyst layers are formed using a washcoat method, for example, a layer of the catalyst support may be formed by a washcoat method followed by supporting the particular catalyst metal, supra, on the obtained catalyst support layer by, for example, a conventionally used impregnation procedure; alternatively, washcoating can be carried out using a catalyst support powder on which the particular catalyst metal has been supported in advance by, for example, an impregnation method. This latter method can provide a more uniform dispersion and support of these catalyst metals in the catalyst layers than supporting the catalyst metal by impregnation after washcoating. There is no particular limitation on the individual catalyst metals Pd and/or Pt and Rh, but they are generally each supported in the individual catalyst layers at supported amounts of 0.1 to 2.0 g/substrate-L (per 1 L of substrate).

This embodiment is described below in greater detail through examples, but the invention is in no way limited to these examples.

EXAMPLE 1

[Formation of the Front-Stage Lower Catalyst Layer]

Using a palladium nitrate solution, Pd (1.0 g/substrate-L (per 1 L of substrate)) was supported by impregnation on 35 g/substrate-L of a $ZrO_2$ composite oxide powder ($ZrO_2$: 68 wt %, $La_2O_3$: 7 wt %, $Y_2O_3$: 25 wt %). This Pd-loaded $ZrO_2$ composite oxide powder was then mixed with 77 g/substrate-L La-doped $Al_2O_3$ ($Al_2O_3$: 96 wt %, $La_2O_3$: 4 wt %), 35 g/substrate-L tetragonal $CeO_2$—$ZrO_2$ composite oxide ($CeO_2$/$ZrO_2$=1.43 (molar ratio)) as an Oxygen storage material, and 5 g/substrate-L $Al_2O_3$ binder, and a coating slurry was prepared by the addition of water. The obtained slurry was then coated by a washcoat method on the exhaust gas upstream portion of a ceramic honeycomb substrate (φ103 mm, L105 mm, volume 875 cc) having a large number of wall-partitioned cells; coating was performed over a distance of 35% with respect to the total length of the honeycomb substrate. This was followed by drying and firing to form the front-stage lower catalyst layer on the cell surfaces in the honeycomb substrate.

[Formation of the Rear-Stage Lower Catalyst Layer]

Then, using a palladium nitrate solution, Pd (0.7 g/substrate-L) was supported by impregnation on 100 g/substrate-L of a tetragonal $CeO_2$—$ZrO_2$ composite oxide ($CeO_2$/$ZrO_2$=0.35 (molar ratio)). This Pd-loaded $CeO_2$—$ZrO_2$ composite oxide powder was then mixed with 45 g/substrate-L La-doped $Al_2O_3$ ($Al_2O_3$: 96 wt %, $La_2O_3$: 4 wt %) and 7 g/substrate-L $Al_2O_3$ binder, and a coating slurry was prepared by the addition of Water. The obtained slurry was coated by a washcoat method on the exhaust gas downstream portion of the aforementioned honeycomb substrate on which the front-stage lower catalyst layer had been formed; coating was performed over a distance of 65% with respect to the total length of the honeycomb substrate, This was followed by drying and firing to form a rear-stage lower catalyst layer on the cell surfaces in the honeycomb substrate.

[Formation of the Upper Catalyst Layer]

Using a rhodium nitrate solution, Rh (0.2 g/substrate-L) was supported by impregnation on 55 g/substrate-L of a $ZrO_2$ composite oxide powder ($ZrO_2$: 68 wt %, $La_2O_3$: 7 wt %, $Y_2O_3$: 25 wt %). This Rh-loaded $ZrO_2$ composite oxide powder was then mixed with 35 g/substrate-L La-doped $Al_2O_3$ ($Al_2O_3$: 96 wt %, $La_2O_3$: 4 wt %) and 5 g/substrate-L $Al_2O_3$ binder, and a coating slurry was prepared by the addition of water. The obtained slurry was coated by a washcoat method on the exhaust gas downstream portion of the aforementioned honeycomb substrate on which the front-stage lower catalyst layer and rear-stage lower catalyst layer had been fowled; coating was performed over a distance of 80% with respect to the total length of the honeycomb substrate. This was followed by drying and firing to obtain an exhaust gas purification catalyst A having an upper catalyst layer formed on a lower catalyst layer formed of a front-stage lower catalyst layer and a rear-stage lower catalyst layer.

COMPARATIVE EXAMPLE 1

An exhaust gas purification catalyst a was obtained proceeding as in Example 1, with the exception that the front-stage lower catalyst layer did not contain the tetragonal. $CeO_2$—$ZrO_2$ composite oxide ($CeO_2$/$ZrO_2$=1.43 (molar ratio)) oxygen storage material.

[Evaluation of the Particle Growth Inhibiting Effect]

Figure 4:
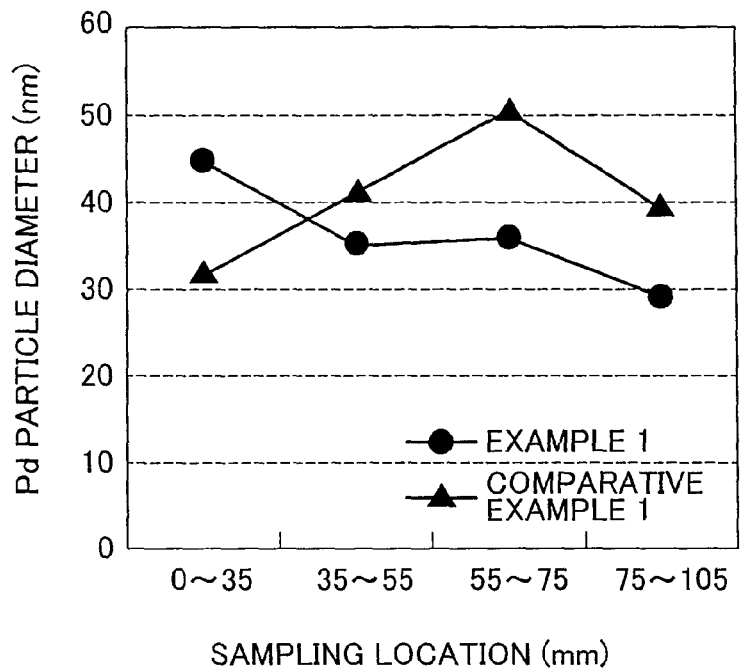
FIG. 4 is a graph that shows the inhibitory effect on Pd particle growth for exhaust gas purification catalyst A of Example 1 and exhaust gas purification catalyst a of Comparative Example 1.

Durability testing using an actual engine was performed on each of the exhaust gas purification catalysts prepared as described above, and the particle diameter of the catalyst metal was examined after the durability testing. Specifically, each exhaust gas purification catalyst was mounted in The exhaust system of a V8 engine, and durability testing was performed by repeated exposure to a rich atmosphere exhaust gas, a stoichiometric atmosphere exhaust gas, and a lean atmosphere exhaust gas at a specified time interval for each for 50 hours at a catalyst bed temperature of 1000° C., Each of the exhaust gas purification catalysts (total length=105 mm) submitted to this durability testing was divided into four regions from the upstream side, i.e., 0 to 35 mm, 35 to 55 mm, 55 to 75 mm, and 75 to 105 mm; the catalyst layer was recovered from each of the segments; and the average particle diameter of the Pd particles was measured in each of these four segments. The Pd particle diameter was calculated using a crystallite diameter calculation method based on measurement of the half-value width in X-ray diffraction. The results are shown in FIG. 4, FIG. 4 is a graph that shows the particle growth inhibiting effect for Pd particles for the exhaust gas purification catalyst A of Example 1 and the exhaust gas purification catalyst a of Comparative Example 1. For the exhaust gas purification catalyst a of Comparative Example 1, which did not have an oxygen storage material disposed in the front-stage lower catalyst layer, FIG. 4 shows that the Pd particle diameter in all the other locations on the exhaust gas downstream side is larger than in the catalyst layer in the location on the exhaust gas upstream side (0 to 35 mm), thus demonstrating that particle growth by the Pd particles has progressed in these locations. In contrast to this, for the exhaust gas purification catalyst A of Example 1, in which an oxygen storage material was disposed in the front-stage lower catalyst layer, the Pd particle diameter became smaller as the catalyst layer was disposed more to the exhaust gas downstream side and Pd particle growth was thus inhibited.

EXAMPLE 2

An exhaust gas purification catalyst B was obtained proceeding as in Example 1, but using a tetragonal $CeO_2$—$ZrO_2$ composite oxide with $CeO_2$/$ZrO_2$=0.35 (molar ratio) as the oxygen storage material in the front-stage lower catalyst layer.

EXAMPLE 3

An exhaust gas purification catalyst C was obtained proceeding as in Example 1, but using a tetragonal CeO—$ZrO_2$ composite oxide with $CeO_2/ZrO_2=0.49$ (molar ratio) as the oxygen storage material in the front-stage lower catalyst layer.

EXAMPLE 4

An exhaust gas purification catalyst D was obtained proceeding as in Example 1, but using a $CeO_2$—$ZrO_2$ composite oxide having a pyrochlore phase and $CeO_2/ZrO_2=1.09$ (molar ratio) as the oxygen storage material in the front-stage lower catalyst layer. This $CeO_2$—$ZrO_2$ composite oxide having a pyrochlore phase was prepared as described in the following.

[Preparation of the $CeO_2$—$ZrO_2$ Composite Oxide having a Pyrochlore Phase]

49.1 g of a 28 mass %, as $CeO_2$, aqueous cerium nitrate solution, 54.7 g of art 18 mass %, as $ZrO_2$ aqueous zirconium oxynitrate solution, and a commercially available surfactant were dissolved in 90 mL, ion-exchanged water; a co-precipitate was then produced by the addition of 1.2-fold equivalents, with reference to the anion, of aqueous ammonia containing 25 mass % $NH_3$; and the obtained co-precipitate was then filtered off and washed. The obtained co-precipitate was then dried at 110° C. and was thereafter baked in air for 5 hours at 500° C. to obtain a solid solution of cerium and zirconium. The obtained solid solution was subsequently ground using a grinder to an average particle diameter of 1000 nm, thereby yielding the powder of a $CeO_2$—$ZrO_2$ solid solution having a molar ratio for the $CeO_2$ and $ZrO_2$ content ($CeO_2/ZrO_2$) of 1.09. This $CeO_2$—$ZrO_2$ solid solution powder was then filled into a polyethylene bag; the interior was degassed; and the mouth of the bag was heat sealed. Then, using a hydrostatic pressure press, molding was performed under the application of pressure for 1 minute at a pressure of 300 MPa to obtain the $CeO_2$—$ZrO_2$ solid solution powder in the form of a solid raw material. This solid raw material was placed in a graphite crucible, which was covered with a graphite lid, and reduction was carried out for 5 hours at 1700° C. in Ar gas. After the reduction, the sample was ground with a grinder to obtain the powder of a $CeO_2$—$ZrO_2$ composite oxide having a pyrochlore phase and having an average particle diameter of approximately 5 μm.

COMPARATIVE EXAMPLE 2

An exhaust gas purification catalyst b was obtained proceeding as in Example 1, but using a CeO $ZrO_2$ composite oxide having a pyrochlore phase and $CeO_2/ZrO_2=1.09$ (molar ratio) as the oxygen storage material and placing this in the rear-stage lower catalyst layer and not in the front-stage lower catalyst layer.

[Evaluation of the Oxygen Storage Capacity]

The oxygen storage capacity was evaluated on each of the exhaust gas purification catalysts A to D, a and b provided by Examples 1 to 4 and Comparative Examples 1 and 2. Specifically, durability testing with a V8 engine was first carried out as described above on each of these exhaust gas purification catalysts. After durability testing, each exhaust gas purification catalyst was installed directly below a straight 4-cylinder engine and, during running conditions in which the temperature of the gas entering the catalyst was 750° C., the air-fuel ratio A/F of the exhaust gas flowing into the catalyst was periodically switched between rich and lean using a prescribed time interval for each. During this switching, the oxygen storage capacity of each exhaust gas purification catalyst was calculated from the behavior lag of the $O_2$ sensor installed at the catalyst outlet. The results are given in FIG. 5.

Figure 5:
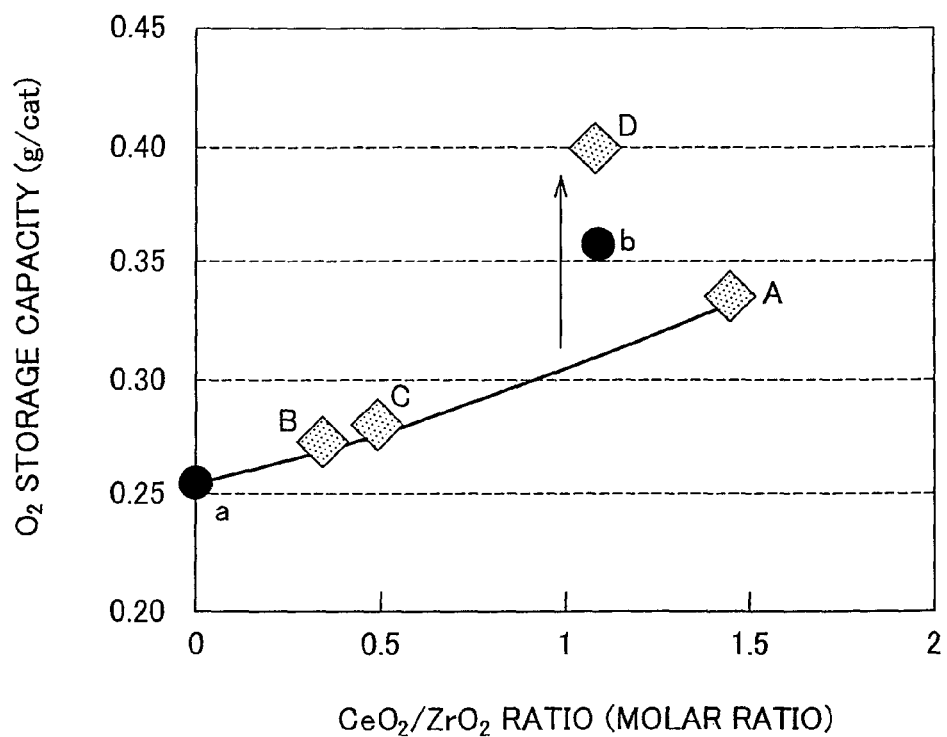
FIG. 5 is a graph that shows the oxygen storage capacity for exhaust gas purification catalysts A to D of Examples 1 to 4 and exhaust gas purification catalysts a and b of Comparative Examples 1 and 2.

FIG. 5 is a graph that shows the oxygen storage capacity for exhaust gas purification catalysts A to D of Examples 1 to 4 and exhaust gas purification catalysts a and b of Comparative Examples 1 and 2. FIG. 5 shows the $CeO_2/ZrO_2$ ratio (molar ratio) on the horizontal axis and the oxygen storage capacity (g/cat) for each exhaust gas purification catalyst on the vertical axis. Reference to FIG. 5 demonstrates that—for exhaust gas purification catalysts A to C according to Examples 1 to 3, in which a $CeO_2$—$ZrO_2$ composite oxide having a typical tetragonal crystalline structure was placed as the oxygen storage material in the front-stage lower catalyst layer—the oxygen storage capacity increases as the $CeO_2/ZrO_2$ ratio increases, in comparison to the exhaust gas purification catalyst a of Comparative Example 1, which did not have an oxygen storage material in the front-stage lower catalyst layer.

In contrast to the preceding, the exhaust gas purification catalyst D of Example 4, in which a $CeO_2$—$ZrO_2$ composite oxide (CeO—$ZrO_2=1.09$) having a pyrochlore phase was placed in the front-stage lower catalyst layer, achieved a much higher oxygen storage capacity than did exhaust gas purification catalyst A of Example 1, which used a tetragonal $CeO_2$—$ZrO_2$ composite oxide ($CeO_2$—$ZrO_2$ 1.43) having a larger $CeO_2/ZrO_2$ ratio than exhaust gas purification catalyst D. It may also be concluded from the results in FIG. 5 that the use of a $CeO_2$—$ZrO_2$ composite oxide having a pyrochlore phase as the oxygen storage material can achieve the same oxygen storage capacity at about one-half the amount of addition in comparison to the use of a tetragonal $CeO_2$—$ZrO_2$ composite oxide having about the same $CeO_2/ZrO_2$ ratio (i.e., $CeO_2$—$ZrO_2$=approximately 1). As is clear from FIG. 5, exhaust gas purification catalyst b of Comparative Example 2, in which the $CeO_2$—$ZrO_2$ composite oxide having a pyrochlore phase was placed in the rear-stage lower catalyst layer and not hi the front-stage lower catalyst layer, was not able to achieve an oxygen storage capacity as good as that for exhaust gas purification catalyst D of Example 4, in which this $CeO_2$—$ZrO_2$ composite oxide having a pyrochlore phase was placed in the front-stage lower catalyst layer.

[Evaluation of the Particle Growth Inhibiting Effect]

The catalyst metal particle diameter in exhaust gas purification catalysts A to D of Examples 1 to 4 was examined in order to carry out a more detailed examination of the influence exercised on catalyst metal particle growth by the differences in the oxygen storage capacity among the individual exhaust gas purification catalysts. Specifically, for exhaust gas purification catalysts A to D of Examples 1 to 4 on which the previously described durability testing with a V8 engine had been run, the catalyst layer was collected for the region corresponding to the range in which the upper catalyst layer was coated and the average particle diameter of the Rh particles in this catalyst layer was measured. The Rh particle diameter was calculated using a crystallite diameter calculation method based on measurement of the half-value width in X-ray diffraction. These results are shown in FIG. 6.

Figure 6:
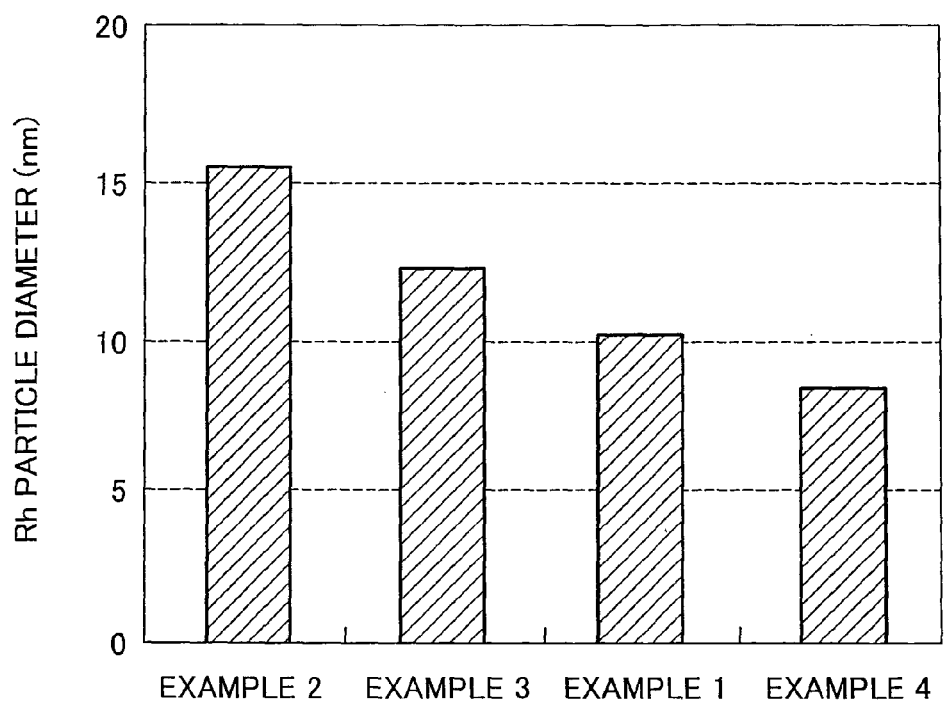
FIG. 6 is a graph that shows the average particle diameter of Rh particles for exhaust gas purification catalysts A to D of Examples 1 to 4.

FIG. 6 is a graph that shows the average particle diameter of the Rh particles for exhaust gas purification catalysts A to D of Examples 1 to 4. Referring to FIG. 6, a trend is seen whereby the average particle diameter of the Rh particles declines as the oxygen storage capacity of the exhaust gas purification catalyst as shown in FIG. 5 increases. It is also clear from these results that particle growth of the catalyst metal can be inhibited by placing a material having a higher oxygen storage capacity in the front-stage lower catalyst layer on the exhaust gas upstream side. Moreover, among these results, the inhibiting effect on catalyst metal particle growth Was substantial in the exhaust gas purification catalyst in which a $CeO_2$—$ZrO_2$ composite oxide having a pyrochlore phase was placed in the front-stage lower catalyst layer.

[Evaluation of the NOx Purification Performance]

The NOx purification performance was then evaluated for exhaust gas purification catalysts A to D of Examples 1 to 4. Specifically, the previously described durability testing using a V8 engine was first carried out on each of the exhaust gas purification catalysts. A rich atmosphere (A/F 14.2) exhaust gas was then fed to each exhaust gas purification catalyst after durability testing; the amount of NOx in the exhaust gas at the catalyst outlet was measured; and this was used to calculate the NOx purification rate for the exhaust gas purification catalyst. The results are shown in FIG. 7.

Figure 7:
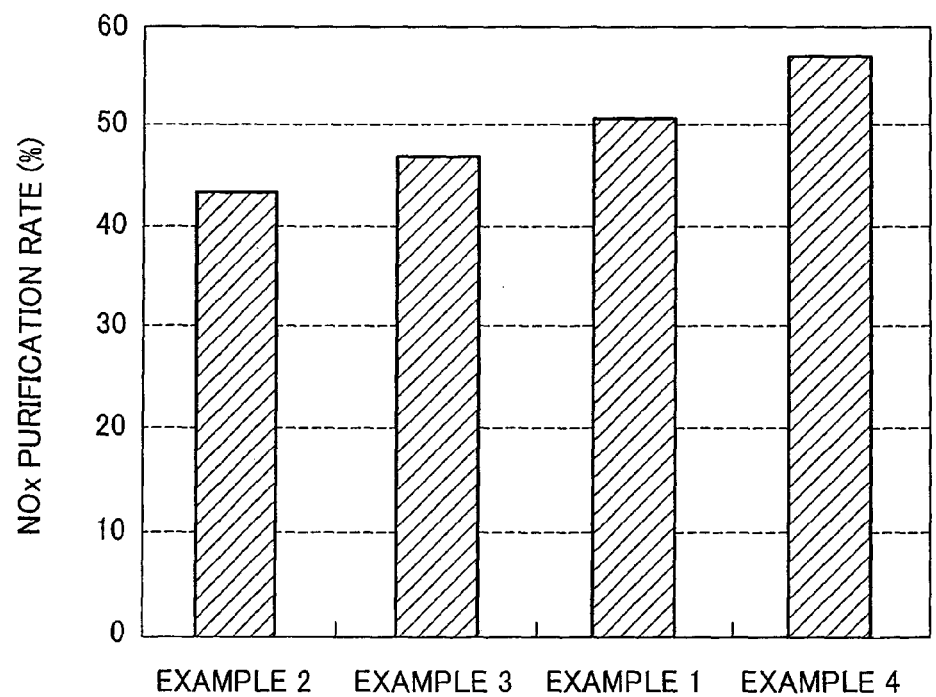
FIG. 7 is a graph that shows the NOx purification rate for exhaust gas purification catalysts A to D of Examples 1 to 4.

FIG. 7 is a graph that shows the NOx purification rate for exhaust gas purification catalysts A to D of Examples 1 to 4. As is clear from FIG. 7, a higher NOx purification rate could be achieved when the exhaust gas purification catalyst had a smaller average particle diameter for the Rh particles as shown in FIG. 6,

[Influence of the Amount of Addition of the Oxygen Storage Material]

Using the exhaust gas purification catalyst D of Example 4, which exhibited the highest oxygen storage capacity and the highest NOx purification performance, the oxygen storage capacity of the exhaust gas purification catalyst was examined when the amount of addition of the $CeO_2$—$ZrO_2$ composite oxide having a pyrochlore phase was varied. This test was carried out using the same procedure as described in relation to FIG. 5, with the exception that durability testing was not run on the individual exhaust gas purification catalysts, and the oxygen storage capacity of the individual exhaust gas purification catalysts was calculated. The results are shown in FIG. 8.

Figure 8:
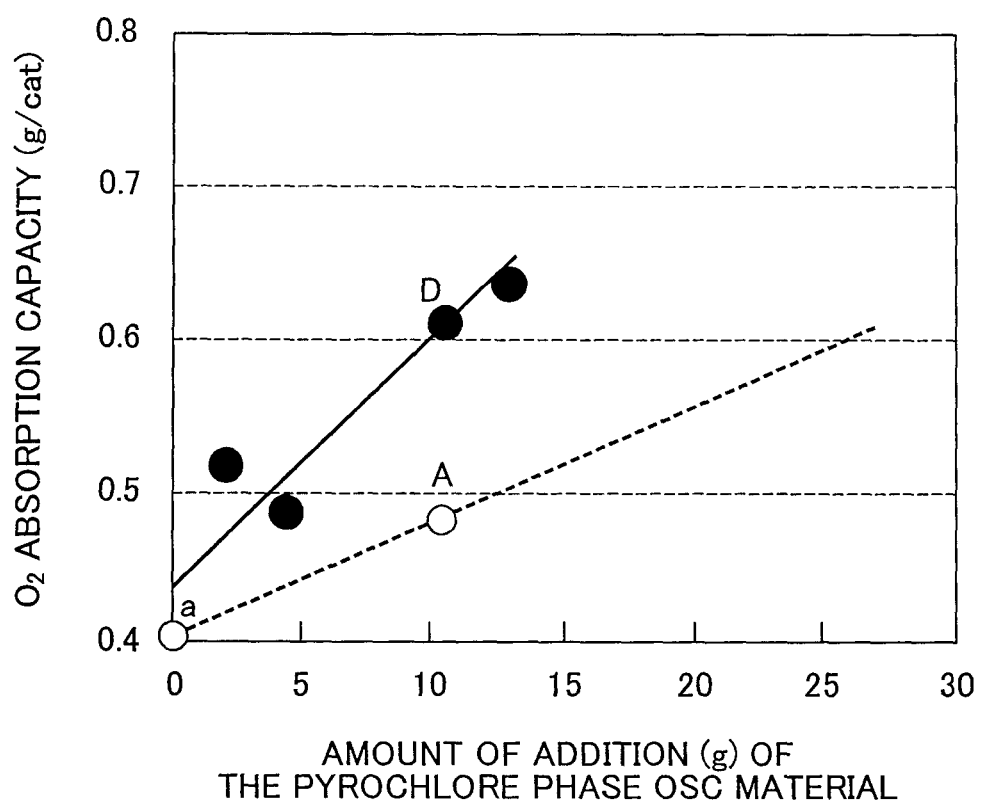
FIG. 8 is a graph that shows the relationship between the amount of addition of a $CeO_2$—$ZrO_2$ composite oxide having a pyrochlore phase and the oxygen storage capacity.

FIG. 8 is a graph that shows the relationship between the amount of addition of the $CeO_2$—$ZrO_2$ composite oxide having a pyrochlore phase and the oxygen storage capacity. In the figure, the data for an approximately 10 g amount of addition corresponds to exhaust gas purification catalyst D of Example 4. For reference, the data are also given that correspond to the exhaust gas purification catalyst a of Comparative Example 1, in which the front-stage lower catalyst layer lacked an oxygen storage material, and exhaust gas purification catalyst A of Example 1, which used a tetragonal. $CeO_2$—$ZrO_2$ composite oxide ($CeO_2$/$ZrO_2$=1.43 (molar ratio)) as the oxygen storage material in the front-stage lower catalyst layer (refer to the dashed line in the figure), Reference to FIG. 8 shows that a relatively high oxygen storage capacity occurred even at a small amount of addition of the $CeO_2$—$ZrO_2$ composite oxide having a pyrochlore phase, and specifically with exhaust gas purification catalysts that used an approximately 2 g amount of addition and an approximately 5 g amount of addition. In addition, the oxygen storage capacity of the exhaust gas purification catalysts exhibited a monotonic increase with the increase in the amount of addition of the $CeO_2$—$ZrO_2$ composite oxide having a pyrochlore phase.

The invention claimed is:

1. An exhaust gas purification catalyst comprising:
a substrate;
a lower catalyst layer that is formed on the substrate and contains at least one of Pd and Pt; and
an upper catalyst layer that is formed on the lower catalyst layer and contains Rh, wherein
the lower catalyst layer is formed of a front-stage lower catalyst layer disposed on a portion of an exhaust gas upstream side in which the upper catalyst layer is not contained, and a rear-stage lower catalyst layer disposed on an exhaust gas downstream side, and the front-stage lower catalyst layer contains an oxygen storage material, wherein the oxygen storage material contains a $CeO_2$—$ZrO_2$ composite oxide having a pyrochlore phase formed of $Ce_2Zr_2O_7$.

2. The exhaust gas purification catalyst according to claim 1, wherein the oxygen storage material further contains a $CeO_2$ composite oxide.

3. The exhaust gas purification catalyst according to claim 1, wherein the oxygen storage material is contained in an amount that provides 20 to 100 g per 1 L of the substrate as the amount of oxygen storage material with reference to the substrate.

4. The exhaust gas purification catalyst according to claim 3, wherein the oxygen storage material is contained in an amount that provides 30 to 60 g per 1 L of the substrate as the amount of oxygen storage material with reference to the substrate.

5. The exhaust gas purification catalyst according to claim 3, wherein the amount of the $CeO_2$—$ZrO_2$ composite oxide contained is at least 5 g.

6. The exhaust gas purification catalyst according to claim 5, wherein the amount of the $CeO_2$—$ZrO_2$ composite oxide contained is not more than 20 g.

7. The exhaust gas purification catalyst according to claim 1, further comprising a catalyst support that supports at least one of Pd and Pt in the front-stage lower catalyst layer, wherein the catalyst support is a $ZrO_2$ composite oxide having $ZrO_2$ as its main component and further containing at least one element selected from the group consisting of La, Y, Pr, and Nd.

8. An exhaust gas purification catalyst comprising:
a substrate;
a lower catalyst layer that is formed on the substrate and contains at least one of Pd and Pt; and
an upper catalyst layer that is formed on the lower catalyst layer and contains Rh,
wherein a region that does not contain the upper catalyst layer is disposed on an exhaust gas upstream side of the exhaust gas purification catalyst, the lower catalyst layer is formed of a front-stage lower catalyst layer disposed on the exhaust gas upstream side and a rear-stage lower catalyst layer disposed on an exhaust gas downstream side, and the front-stage lower catalyst layer contains an oxygen storage material, wherein the oxygen storage material contains a $CeO_2$—$ZrO_2$ composite oxide having a pyrochlore phase formed of $Ce_2Zr_2O_7$, and
wherein the front-stage lower catalyst layer is coated over 20 to 35% of the total length of the substrate, the rear-stage lower catalyst layer is coated over 65 to 80% of the total length of the substrate, and the upper catalyst layer is coated over 80 to 90% of the total length of the substrate.

9. An exhaust gas purification catalyst comprising:
a substrate;
a lower catalyst layer that is formed on the substrate and contains at least one of Pd and Pt; and
an upper catalyst layer that is formed on the lower catalyst layer and contains Rh,
wherein a region that does not contain the upper catalyst layer is disposed on an exhaust gas upstream side of the exhaust gas purification catalyst, the lower catalyst layer is formed of a front-stage lower catalyst layer disposed on the exhaust gas upstream side and a rear-stage lower catalyst layer disposed on an exhaust gas downstream side, and the front-stage lower catalyst layer contains an oxygen storage material, wherein the oxygen storage material contains a $CeO_2$—$ZrO_2$ composite oxide having a pyrochlore phase formed of $Ce_2Zr_2O_7$, and
wherein the front-stage lower catalyst layer is exposed to inflowing exhaust gas over 10% to 20% of the total length of the substrate.

* * * * *